United States Patent
Dong

(10) Patent No.: US 10,076,763 B2
(45) Date of Patent: Sep. 18, 2018

(54) PROPELLER LIFT SUSPENSION BOOM TRUSS SPRAY COMBINATION MODULE SYSTEM

(71) Applicant: Dawei Dong, Stockton, CA (US)

(72) Inventor: Dawei Dong, Stockton, CA (US)

( * ) Notice: Subject to any disclaimer, the term of this patent is extended or adjusted under 35 U.S.C. 154(b) by 126 days.

(21) Appl. No.: 15/349,570

(22) Filed: Nov. 11, 2016

(65) Prior Publication Data

US 2018/0133741 A1    May 17, 2018

(51) Int. Cl.
*B64D 1/16* (2006.01)
*B05B 15/628* (2018.01)
*B05B 9/00* (2006.01)
*B05B 9/03* (2006.01)
*B05B 12/12* (2006.01)
*B05B 13/00* (2006.01)
*A01M 7/00* (2006.01)
*B64D 1/18* (2006.01)

(52) U.S. Cl.
CPC .......... *B05B 15/628* (2018.02); *A01M 7/005* (2013.01); *A01M 7/0053* (2013.01); *A01M 7/0082* (2013.01); *B05B 9/007* (2013.01); *B05B 9/035* (2013.01); *B05B 12/12* (2013.01); *B05B 13/005* (2013.01); *B64D 1/16* (2013.01); *B64D 1/18* (2013.01)

(58) Field of Classification Search
CPC ....... B05B 15/628; B05B 9/007; B05B 9/035; B05B 12/12; B05B 13/005; A01M 7/0053; A01M 7/005; A01M 7/0082; B64D 1/16; B64D 1/18

USPC ....... 239/159, 160, 164, 166, 167, 169, 171, 239/172, 175; 244/136
See application file for complete search history.

(56) References Cited

U.S. PATENT DOCUMENTS

| 2,613,109 | A | * | 10/1952 | Walker | A01M 7/0014 239/172 |
| 2,963,226 | A | * | 12/1960 | La Roque | A01M 7/0082 239/167 |
| 3,445,065 | A | * | 5/1969 | Waldrum | B64D 1/16 239/171 |
| 4,290,500 | A | * | 9/1981 | Hopkins | B60V 3/02 239/159 |
| 4,948,050 | A | * | 8/1990 | Picot | B64D 1/18 239/171 |

(Continued)

*Primary Examiner* — Steven J Ganey
(74) *Attorney, Agent, or Firm* — Chen-Chi Lin

(57) ABSTRACT

The new invention uses a ground-based heavy payload ground vehicle, trailer, or fixed ground station to deliver agriculture chemical, power and control signals to a hinged, ground-mounted, lightweight propeller lift, boom truss module using Unmanned Aerial Vehicles (UAVs) technology to unload and suspend multiple boom truss modules, extending out to cover a large spray area. This is the newest, most practical invention that is low cost and easy to use. The total weight of each suspension boom truss modules is less than 10 kilograms and can be completely unloaded by motor-driven propellers. The suspended boom truss module is hinged on the ground vehicle, trailer or ground station. It is not necessary to apply for a flight permit from the FAA. In the field, the propeller and toxic pesticides are fixed on the suspension boom truss module and hazards can be controlled to a minimum for personnel safety.

12 Claims, 6 Drawing Sheets

(56) References Cited

U.S. PATENT DOCUMENTS 6,769,493 B1 * 8/2004 Fima ..................... A01C 7/085
  244/136

* cited by examiner

PROPELLER LIFT SUSPENSION BOOM TRUSS SPRAY COMBINATION MODULE SYSTEM

BACKGROUND OF INVENTION

This invention patent herein, called: Propeller lift suspension boom truss spray combination module system. This uses a propeller lift power to suspend a long boom truss module equipped with spray nozzles, and can be combined together with multiple modules to form a long string. A suspended boom truss spray module with one end hinged to a ground vehicle, trailer or fixed station, delivering liquid from the ground to the suspended boom truss module spray nozzles, and providing power and control signals to the truss module and propeller system.

Ever since tractors replaced livestock and manpower, there is rapid development of a variety of agricultural machinery in the field of agricultural plant protection. In the United States the use of agricultural aircraft spraying and long boom spraying from large horsepower tractor is the main force. In recent years, Unmanned Aerial Vehicles (UAVs) have been overrated for agricultural spraying. From the long-term development point of view, not only UAV sprayer, but all farming to harvest agricultural labor will eventually be replaced by robots. So far, to market unmanned control technology for civilian use is a long distance away and takes a long time to mature. Currently, FAA prohibits high-load UAVs into the commercial use. At present, the agricultural drones overrated by Asian countries only carry about 10 liters of agricultural chemical and a flight time of around 10 minutes. This is a garden-level product and for the needs of large scale agriculture there is a long way to go. From now to tomorrow, the market demand in the interim is to develop an invention that is low cost and easy to use technology than the agricultural aircraft and long boom high-powered spraying tractors.

The inventor has over thirty years of experience in research and development of manned and unmanned helicopters with several experimental prototype models. On this basis, invented the high performance, half-fly & half-walk, propeller lift suspension boom truss spray combination module system that suspends a boom truss module over the fields and crops to spray. Hinges on a ground vehicle or trailer or ground station and do not have to apply for a permit from the FAA.

At present, the Asian country's overrated agricultural plant protection sprayer UAV (Unmanned Air Vehicle) is of limited use. Each take off can only carry about 10 liters of liquid, and a flight time of about 10 minutes. This garden-level product cannot meet the needs of large-scale agricultural development. In the United States the autonomous flight control technology for civilian use is not ready. For safety reasons, FAA cannot approve certification of UAVs payload of more than 20 kilograms to 100 kilograms of agricultural spray for business user into the commercial market for the next several years. Between now and tomorrow, the market demand is to develop a new product invention that is lower cost than the agricultural aircraft and long boom spraying tractors. Today's need is for new agricultural invention with simple to use technology and higher efficiency.

This new invention is significantly lower cost to own, operate, maintain, and less technical requirements than existing agricultural spray aircraft and long boom spraying tractors.

The disclosure of this patent will make possible the important invention for the development of large-scale agriculture.

SUMMARY OF THE INVENTION

Boom truss module: The module of the invention comprises a boom truss made of light weight carbon fiber tube on which standard spray nozzles of various types can be installed at the required distance, standard universal joints at both ends of the trusses to connect liquid delivery pipes, power supply, control signal to propeller system, and automatic folding recovery and self-locking system. Within the boom truss module, houses a high-energy brushless motor and propeller to provide upward lift and zero weightlessness. The boom truss module can be easily combined with another boom truss module according to the use of the environment and select a number of combinations to extend out to increase the reach and spray area.

Ground system: A ground vehicle is equipped with a large capacity tank, liquid pressure pump and valve, higher power DC generators and battery systems, and control box.

Control system: The control switches and joystick are mounted on a control box. This can control the boom truss module's upward lift, unloading, forward and backward direction to synchronize with the movement of the ground vehicle. The truss-out and foldaway switch is linked to the motor driven propeller. Separate switches control liquid spraying. The control box can also be connected remotely. Operation can be remotely controlled wirelessly using onboard video from a central control room through a video screen.

It is important that the lift propeller on the suspension boom truss spray combination module system is powered by a generator on a ground system and can be operated for a long time. Liquid is transported by a pump from the ground system and suspended onto the lightweight boom truss module, and can be lifted by the propeller. For large scale agriculture, it provides the newest, cheapest, most effective, large volume spray system.

01) Light weight carbon fiber tube truss. The high-strength lightweight boom truss module are available in lengths of 8 m and 10 m each. Multiple boom truss modules can be connected to extend out into a long string for the largest spray area.

02) Standard link assembly at both ends of the boom truss module. This allows for the connection of additional boom truss modules to extend outward, and each can be folded back at 90 degrees for transport and collection. The detailed structure of the standard link assembly will be described in FIG. 03.

03) This is a standard interchangeable spray nozzle. It can be installed and replaced according to the spray requirement of liquid particles.

04) Lifting and unloading propeller assembly. The total lifting force of the propeller is equal to the sum of the tube truss, standard link assembly, the standard spray nozzle, the motor propeller assembly, and the weight of the suspended liquid. The detailed structure of the lifting propeller assembly is described in FIG. 04.

Figure 1:
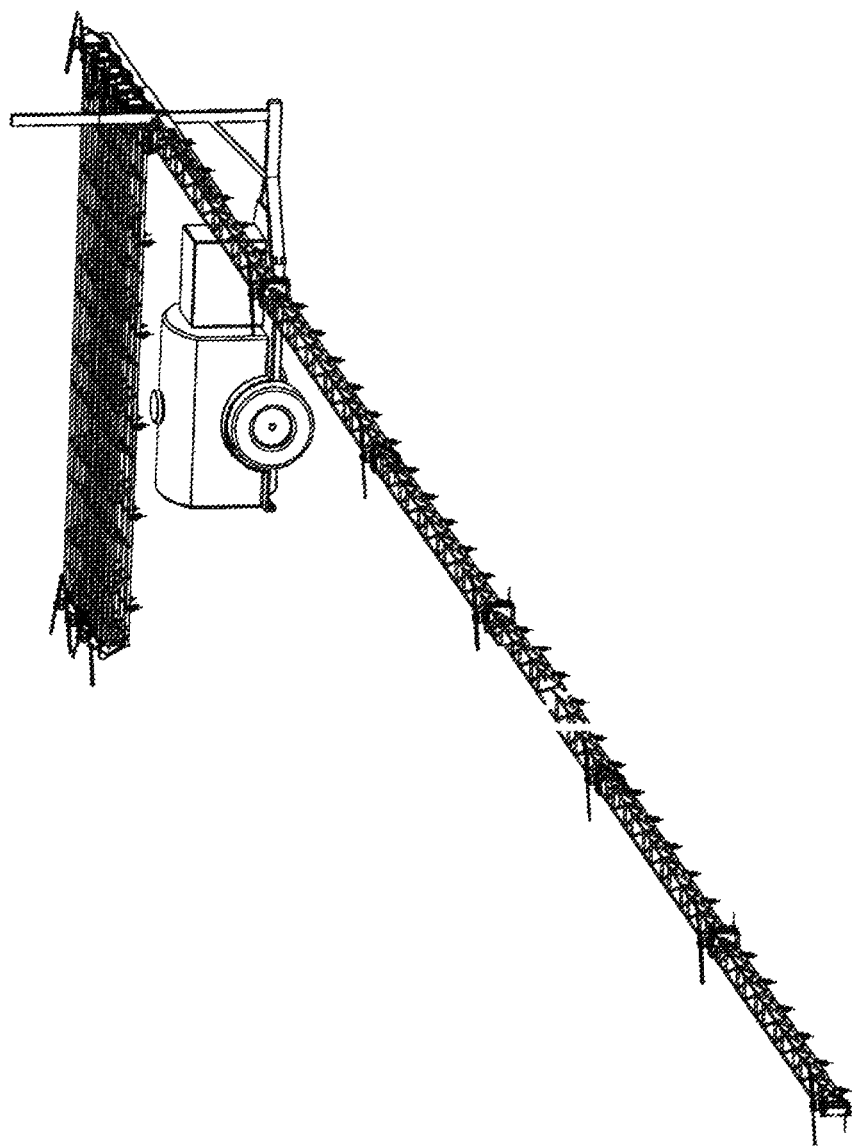
FIG. 1. Illustration of the propeller lift suspension boom truss spray combination module system, with the ground vehicle and one hinged side folded away. The other side extended into a string for the largest spray area.
Figure 2:
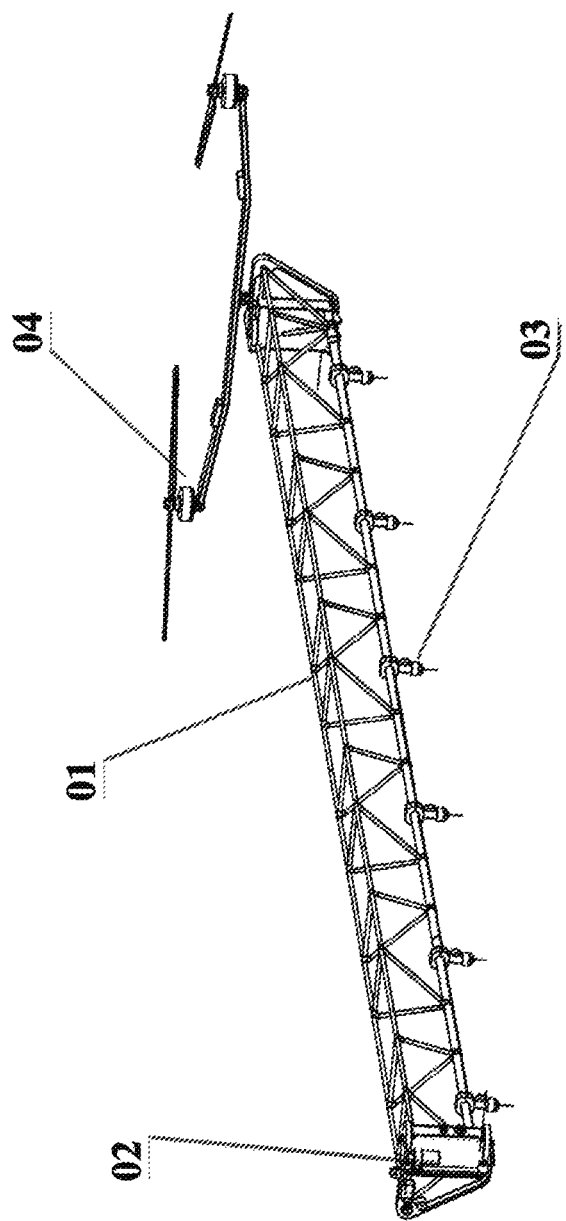
FIG. 2. One unit of the propeller lift suspension boom truss spray combination module. The structure is described below.
Figure 3:
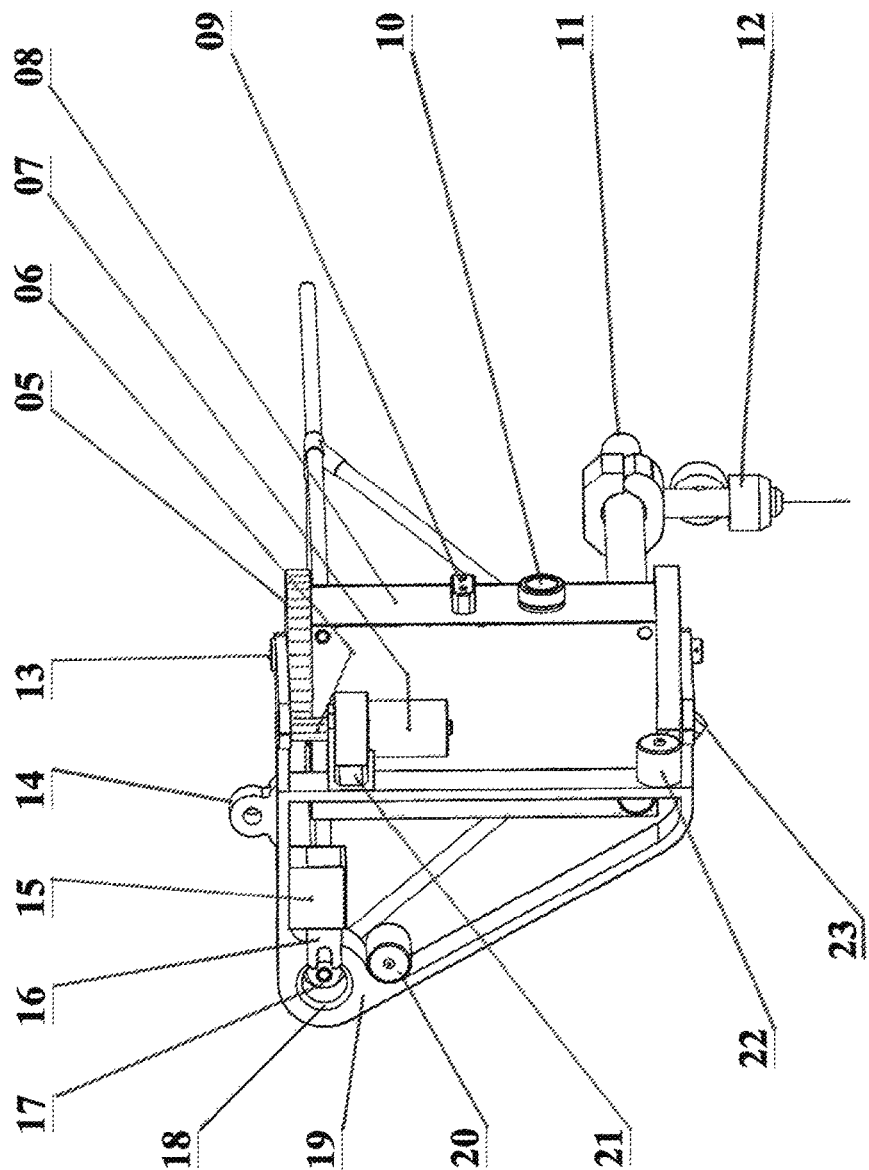

FIG. 3. Detailed description of the standard link assembly.

The standard link assembly located at both ends of the boom truss module uses a standard long pin (13) to connect multiple boom truss modules one by one. Its structure is as follows:

(05) 93-tooth nylon gear for folding boom truss module.

A pair of nylon gears is located on the upper and lower joint assembly and between two boom truss modules adjacent to each other to synchronize the closure. The nylon gears at both ends of the standard link assembly are fixed on each end so that the angles of the half teeth are different from the left and right to allow the boom truss module to extend into straight line. A standard long pin 13) running through the center of the upper and lower nylon gear 05) allows the boom truss module to fold and collect along this axis.

06) 10-pinion gear.

This drives the large gears 05) for folding and collection of the boom truss module. The pinion is driven by a motor 07)

07) 12V DC motor with reduction gear box for folding and collection of the boom truss module.

08) A fixed rectangular box is used to strengthen the carbon fiber trusses and fixed folding gear and plug-in circuit connection.

09) Lifting and unloading propeller drive motor power transmission plug.

10) Self-locking socket for ground control signal, 12-volt power supply, and multi-line detection circuit.

11) Carbon fiber tube, used for delivery of liquid chemical and as the main beam of the boom truss module.

12) Standard interchangeable spray nozzles.

13) A standard long pin made from aluminum alloy, carbon fiber composite material, used for connection, folding, and collection of the boom truss module.

14) Aluminum alloy fixed joint connector for lifting and unloading propeller assembly.

15) The electrical latch assembly for the boom truss module to extend into place.

16) Electrical latch locking plug.

17) Truss side locking catch.

18) Truss side locking catch insertion hole.

19) Aluminum alloy, carbon fiber composite truss connection bracket

20) Limit position switch for the locking the main truss fold position and extend position.

21) The trusses located in the main fixing frame 19) are folded to extend the motor holding frame.

22) Limit switch for boom truss module to fold in position.

23) Liquid chemical delivery hose connector. For folded and extended positions.

Figure 4:
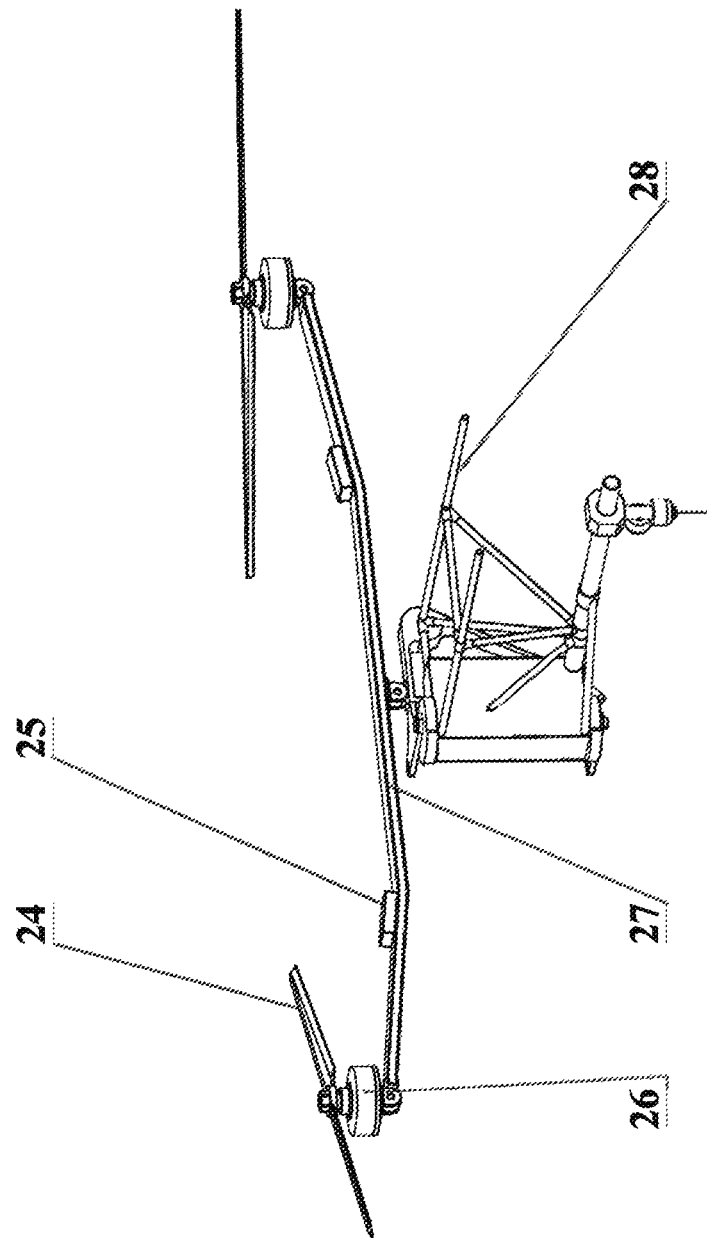

FIG. 4. Lifting and unloading propeller assembly. The total lifting force of the propeller is equal to the sum of the tube truss, standard link assembly, standard spray nozzle, motor propeller assembly, and the weight of the suspended liquid. Its structure is as follows:

24) Lifting and unloading propeller. In order to facilitate the folding, unloading, and transport of the truss module, a two-blade carbon fiber propeller is used.

25) Electronic brushless motor governor.

26) Brushless high-energy drive motor.

27) Carbon fiber composite fixed motor bracket.

28) High strength carbon fiber triangular main truss.

Figure 5:
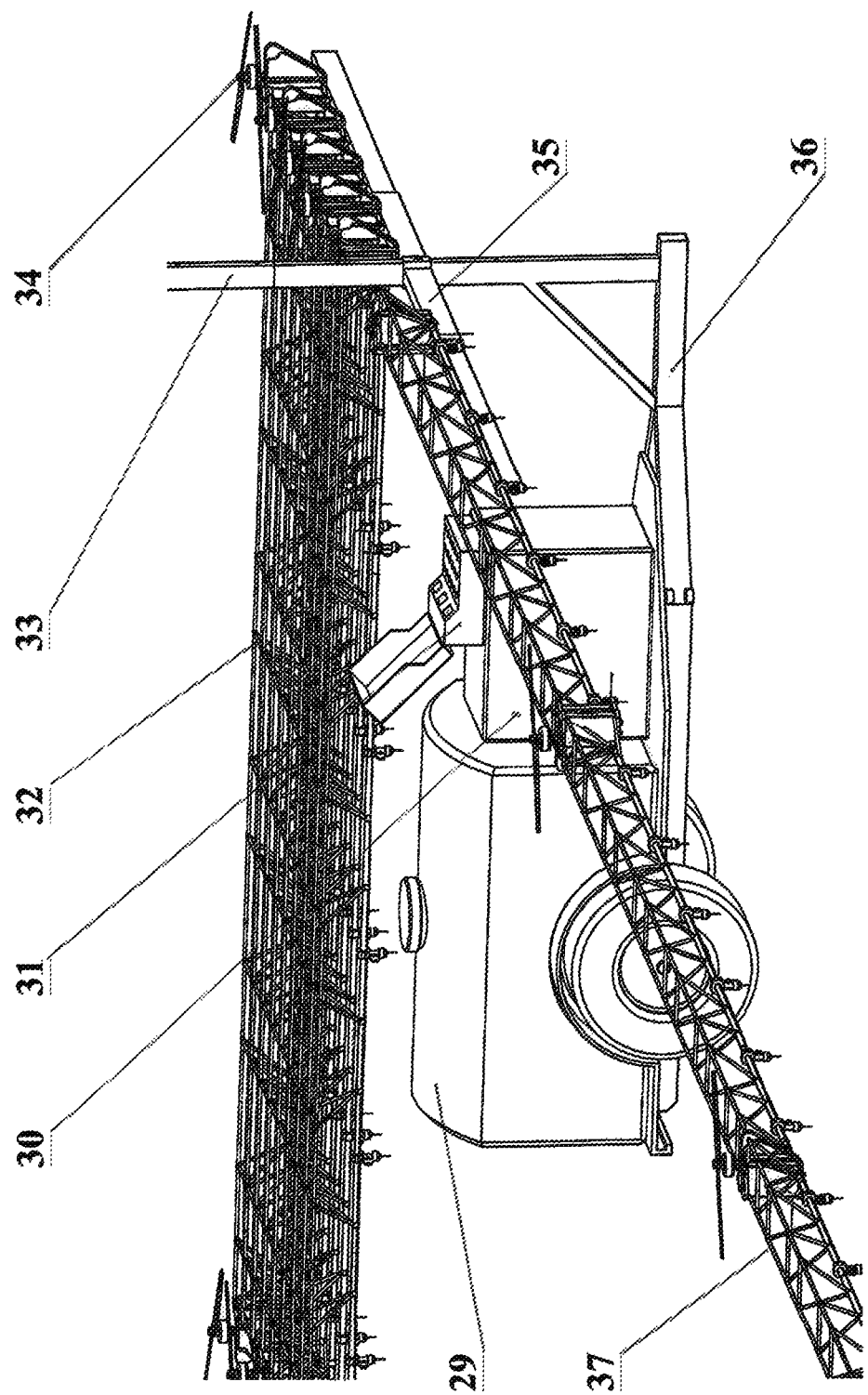

FIG. 5. Ground vehicle or trailer. The ground vehicle or trailer is equipped with a large capacity tank, liquid pressure pump, liquid delivery valve, a backflow valve, a high powered DC generator, battery and charging system, main control box, adjustable support arm for boom truss module folding, unloading, transport and a main mast with height adjustment. The main structural components are as follows:

29) Large-capacity tank on the ground vehicle or trailer for storage and delivery of liquid chemical.

30) High-powered DC generator with power supply voltage meter, switches, charging and battery system.

31) Main control box. Equipped with switches and LCD display to control and indicate the folding or extension of the boom truss module position, and the status of motor and propeller data. A joystick controls movement of the lifting and unloading propeller.

The main control box is connected by an extension cable, which allows it to be moved freely with the user. It also can be connected wirelessly using a remote control system from a central control room monitored through a video screen.

32) A group of boom truss modules in folded position for convenient transport or collection.

33) The main mast is fixed to the ground vehicle or trailer with height adjustment in order to adjust the spray height.

34) Lifting and unloading propeller assembly in folded storage position.

35) Adjustable support arm that supports and links the suspended boom truss module to extend or collapse.

36) A ground vehicle or trailer.

37) A group of boom truss modules extended in operating position.

Figure 6:
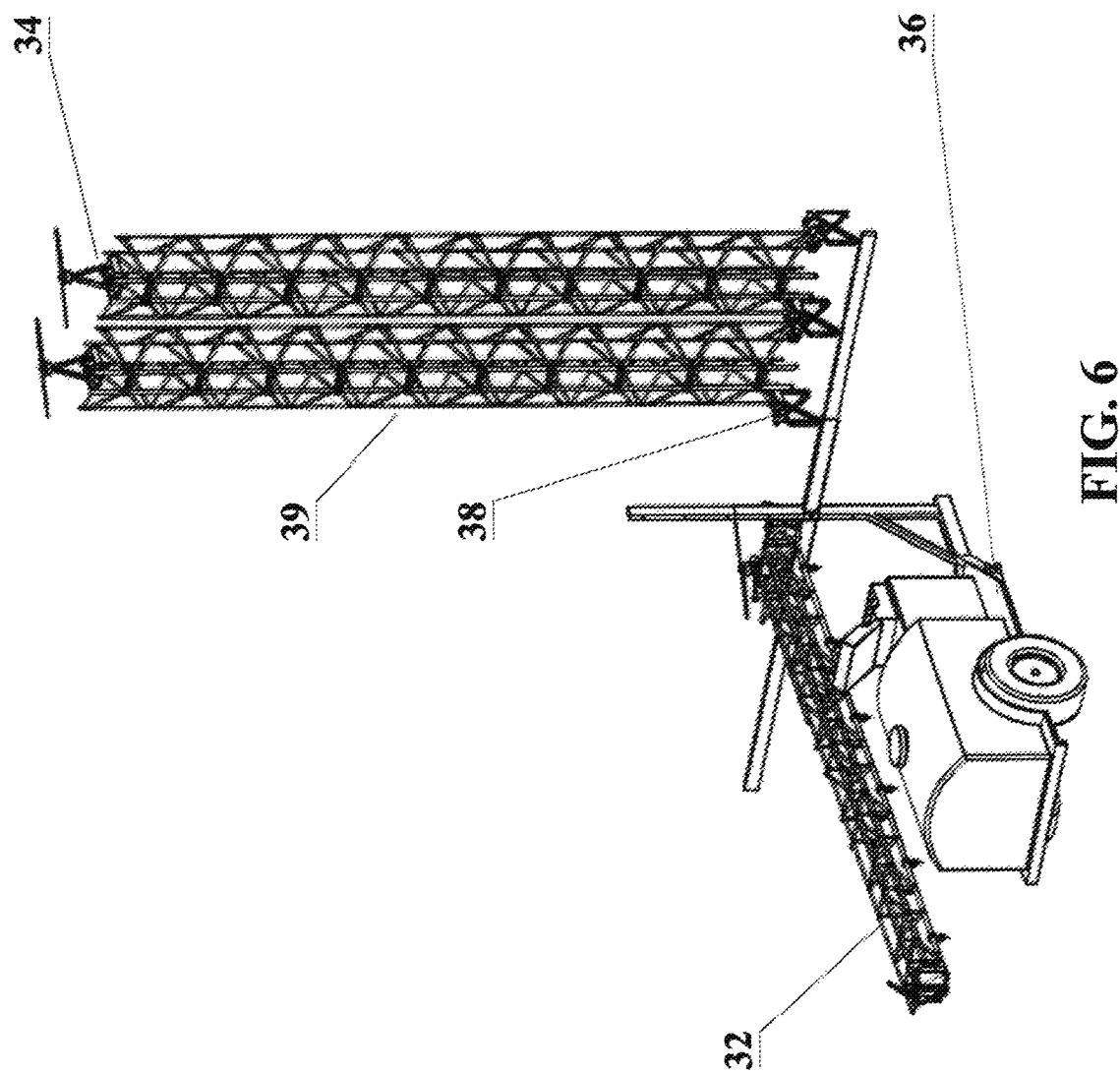

FIG. 6. Is another form of extension and collection of the propeller lift suspension boom truss spray combination module system. The boom truss modules is propelled upward and a vertical folding movement to extend, unload, and collect the group of boom truss modules.

38) Vertical standard link assembly provides upward folding movement for the suspended boom truss modules.

39) Group of suspension spray truss modules in vertical upward folded collected position.

DETAIL DESCRIPTION OF THE PREFERRED EMBODIMENTS

Lifting and unloading propeller assembly as shown in FIG. 4 comprises a propeller 24) an electronic speed governor 25) brushless high-energy drive motor 26) and a fixed motor bracket 27). This assembly can unload its self-weight of the suspension boom truss spray combination module, which includes a truss module assembly made from lightweight carbon fiber tubes 01) equipped with a liquid chemical delivery hose connector 23), power supply and transmission plug 09) self-locking socket for ground control signal to enhance the propeller control 10) and automatic folding recovery and self-locking system 15) and 16); At the end of the boom truss module is a high-energy brushless motor and driving propeller that lifts the entire length and weight of the module so that it unloads itself like a balloon with zero gravity. The boom truss module 01) can be easily combined with additional modules according to the requirement of the environment. Use any number of combinations, so that it extends outward, increasing the spray area.

An assembled long string of suspended zero-weight high-strength boom truss modules 01) is hinged at one end of the ground vehicle or supply trailer 36), delivers chemical liquid from the ground system to the spray nozzle and provide continuous power supply and control signals so that it can be in zero gravity suspension and in long term continuous spraying.

The ground vehicle or trailer is equipped with a large-capacity tank 29), a liquid pressure pump, main valve, a high-power direct current generator and battery system 30), a truss-out and folding-up control switch, a control switch linked to the propeller, a spraying liquid switch, and liquid discharge switch to reduce the weight during recovery of the boom truss modules.

As the ground vehicle or trailer moves, the lift propeller on the boom truss module can change motor RPM for the front and rear propellers by means of a speed adjuster so that the lift force of the front and rear propellers can move the boom truss module with the ground vehicle, stabilize air resistance like wind, and to synchronize forward or backward movement.

The boom truss module forward and reverse control joystick and all control switches and displays, are mounted in a control box 31). The main control box is connected by an extension cable, which allows it to be moved freely away from a stationary position. The control box can also be connected by a remote control system or from a central control room monitored through a video screen for optimal control.

It is important the power source for the propeller lift suspension boom truss spray combination module system is provided by a ground generator or from a continuous power source in order to operate for a long time. It is also important chemical liquid is supplied from a ground system and transferred by a liquid pump to the boom truss module, and the suspended liquid weight is light enough a rotor propeller can lift.

What is claimed:

1. A high-strength lightweight boom truss combination module system comprising:
   one or more boom truss modules;
   a plurality of nozzles for spraying attached to the one or more boom truss modules;
   a high powered motor;
   one or more propellers;
   a ground vehicle or a trailer;
   a liquid pump; and
   a plurality of link assemblies configured to link the one or more boom truss modules;
   wherein the one or more boom truss modules are configured to be suspended in air and is configured to be lifted by the one or more propellers driven by the high powered motor so that the one or more boom truss modules are lifted at a predetermined spray height;
   wherein an end of a selected boom truss module of the one or more boom truss modules is linked to the ground vehicle or the trailer;
   wherein liquid chemical is delivered by the liquid pump;
   wherein the ground vehicle or the trailer supplies continuous power and control signals to the one or more propellers so as to operate the one or more boom truss modules in a zero gravity condition in which a total weight of the one or more boom truss modules, the plurality of link assemblies, the plurality of nozzles, the high powered motor, and a portion of the liquid chemical is overcome by a total lifting force of the one or more propellers; and
   wherein the high-strength lightweight boom truss combination module system is configured to allow continuous spraying operation.

2. The high-strength lightweight boom truss combination module system as described in claim 1, wherein the one or more boom truss modules are made of lightweight carbon fiber tubing, carbon fiber composite material, fiberglass tubing, fiberglass composite material, aluminum alloy, titanium alloy, or light-weight wood.

3. The high-strength lightweight boom truss combination module system as described in claim 1, wherein lift power is provided by the high-powered motor driving the one or more propellers allowing unloading and suspending the one or more boom truss modules at the predetermined spray height; wherein rotation of the one or more propellers are driven by a brushless or brushed high-powered motor, a light piston engine, or a small turbine engine; and wherein the high-powered motor and the brushless or brushed high-powered motor are powered or fueled by the ground vehicle or the trailer.

4. The high-strength lightweight boom truss combination module system as described in claim 3, wherein a ground control system controls the total lifting force of the one or more propellers and tilts a tension line of the one or more propellers to provide forward or backward force.

5. The high-strength lightweight boom truss combination module system as described in claim 4, wherein each boom truss module of the one or more boom truss modules is paired with a respective front propeller of the one or more propellers and a respective rear propeller of the one or more propellers; and wherein a rotational speed of the one or more propellers is adjusted by the ground control system so that a motion of the one or more boom truss modules follows the ground vehicle or the trailer.

6. The high-strength lightweight boom truss combination module system as described in claim 5 further comprising a lift source containing a hydrogen or helium balloon and a horizontally placed motorized propeller.

7. The high-strength lightweight boom truss combination module system as described in claim 1, wherein the one or more boom truss modules are configured to be connected, folded, collapsed, unfolded, or unloaded.

8. The high-strength lightweight boom truss combination module system as described in claim 7, wherein the plurality of link assemblies connect adjacent boom truss modules of the one or more boom truss modules; and wherein folding and extension of the one or more boom truss modules are controlled by an electric motor and an air cylinder drive gear.

9. The high-strength lightweight boom truss combination module system as described in claim 7, wherein the plurality of nozzels are controlled by an electronic valve to regulate spray volume and wherein electronic valve is controlled by a ground station computer system that uses data from aerial photographs to quantitatively implement precise spraying.

10. The high-strength lightweight boom truss combination module system as described in claim 7, wherein after the one or more boom truss modules extending outward, the one or more boom truss modules are configured to move forward on both sides of the ground vehicle or the trailer.

11. The high-strength lightweight boom truss combination module system as described in claim 1, wherein the one or more boom truss modules are characterized by:

a stored condition in which the one or more boom truss modules are aligned along a longitudinal direction of the ground vehicle or the trailer; and an expanded condition in which the one or more boom truss modules are extended along a lateral direction perpendicular to the longitudinal direction of the ground vehicle or the trailer.

12. The high-strength lightweight boom truss combination module system as described in claim 1, wherein the one or more boom truss modules are characterized by:
   a stored condition in which
      the one or more boom truss modules are aligned along a vertical direction away from a top side of the ground vehicle or the trailer; and
   an expanded condition in which
      the one or more boom truss modules are extended along a lateral direction perpendicular to the vertical direction.

\* \* \* \* \*